Patented Nov. 5, 1946

2,410,531

UNITED STATES PATENT OFFICE 2,410,531

SYNTHESIS OF VITAMIN B6

Lester J. Szabo, Cleveland, Ohio, assignor, by mesne assignments, to Wyeth Incorporated, Philadelphia, Pa., a corporation of Delaware No Drawing. Application June 13, 1940, Serial No. 340,408

2 Claims. (Cl. 260—297.5)

This application is a continuation in part of my prior application, Serial Number 314,563, filed January 18, 1940, which application was a continuation in part of my prior application Serial Number 295,987, filed September 21, 1939.

It has been definitely determined that vitamin B6 or Adermin, is 2-methyl-3-hydroxy-4,5-di-(hydroxymethyl)-pyridine and capable of synthesis.

In my prior filed applications I have used an isoquinoline as a starting point in the synthesis of Adermin and in the present application I am using derivatives of a normal quinoline such as the cinchoninic acids.

I have found the following to be suitable for the purpose.

I. 2-methyl-3-alkoxy (or aryloxy)-cinchoninic acids of the formula

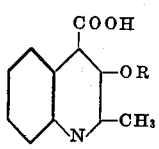

where R=methyl, ethyl, phenyl, propyl, butyl, cresyl and triphenylmethyl.

II. 2 - methyl-3-methoxy-(x)-amino cinchoninic acid

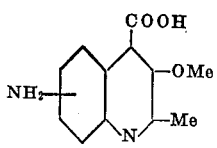

III. 2-methyl - 3 - methoxy-(x)-hydroxy-cinchoninic acid.

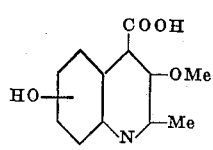

IV. 2 - methyl-3-methoxy-B2-substituted cinchoninic acid.

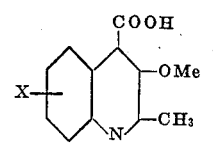

where X=amino (—NH2), hydroxy (—OH), halogen (Cl, Br, etc.).

The compounds above given may be oxidized by the same method of my prior applications by the use of potassium permanganate, copper sulfate pentahydrate, sulfuric acid and sodium hydroxide, but in the present process the oxidation yields a tricarboxylic acid. The tricarboxylic acid is then dicarboxylated by high vacuum sublimation. The anhydride obtained is treated with water to obtain the corresponding dicarboxylic acid. Sublimation may be dispensed with.

As a specific example 150 g. Bz-amino-2-methyl-3-methoxy-cinchoninic acid is gradually added to a mixture of 615 grams of potassium permanganate in about 7 liters of water. The addition is regulated so as not to allow the temperature to rise above 65° C. If the reaction does not start soon after the addition of the acid the solution is warmed sufficiently to start the reaction. The reaction is allowed to proceed until the characteristic color of the permanganate has been discharged. The manganese oxides are then filtered off. The clear filtrate is made acid with sulfuric acid to phenolphtalein, heated to boiling and 300 g. crystalline copper sulfate (pentahydrate) are added with stirring until dissolved. The solution is cooled and the precipitated copper salts are filtered off and washed with water.

The copper salts are suspended in about five times their weight of water, heated to boiling and hydrogen sulfide is passed in until the copper is completely precipitated. The precipitated copper sulfide is filtered off and washed with warm water. The clear filtrate is thoroughly cooled and the crystals of 2-methyl-3-methoxypyridine-4,5,6-tricarboxylic acid are filtered off and recrystallized from hot water and dried.

The copper salts may also be decomposed by boiling in alkaline solution and precipitating the organic acid with a mineral acid. The 2-methyl-3-methoxypyridine-4,5,6-tricarboxylic acid may then be decarboxylated by subliming under high vacuum and the 2-methyl-3-methoxypyridine-4,5-dicarboxylic anhydride thus obtained, treated with warm water to obtain the free acid (2-methyl - 3 - methoxypyridine - 4,5-dicarboxylic acid).

In lieu of decarboxylation by vacuum sublimation, the tricarboxylic acid can be decarboxylated by heating with acetic anhydride in the presence of glacial acetic acid, the product again being 2-methyl-3-methoxypyridine-4,5-dicarboxylic anhydride.

The dicarboxylic acid thus obtained is esterified with an alcohol as in my prior application, Serial No. 314,563 and the di-ester then treated with about 700 cc. to 800 cc. of concentrated aqueous ammonia accompanied by vigorous shaking and the mixture allowed to stand for some time. The solid formed is then filtered off or the excess ammonia and water removed by low temperature distillation under vacuum. A white crystalline solid is obtained being, 2-methyl-3-methoxypyridine - 4,5 - dicarboxamide. It is somewhat soluble in water and soluble in alcohol. It melts on heating with evolution of ammonia and formation of the corresponding imide in crystalline solid form.

The 2-methyl-3-methoxypyridine-4,5-dicarboxamide thus obtained is further treated in accordance with the process disclosed in my prior application in that the dicarboxamide is treated with thionyl chloride, heated, cooled, neutralized with a suitable alkali, extracted with a suitable solvent such as chloroform, evaporated and recrystallized from alcohol to form 2-methyl-3-methoxy-4,5-dicyanopyridine. In my present process the dehydration of the dicarboxamide to the dinitrile may be accomplished additionally by the use of phosphorus pentachloride or catalytically over a heated catalyst suitable for the purpose such as silica gel.

V. Formation of 2-methyl-3-methoxy-4,5-di-(amino-methyl)-pyridine.

43 grams of the 2-methyl-3-methoxy-4,5-dicyanopyridine obtained as above is dissolved in 1800 cc. of glacial acetic acid with the addition of 40 grams of a 5% palladium charcoal catalyst containing 2.5% platinum oxide. The mixture is shaken with hydrogen under low pressures of from three to five atmospheres until four moles of hydrogen are absorbed. The solution is then filtered and evaporated under reduced pressure to dryness. The resultant residue may or may not be recrystallized from alcohol.

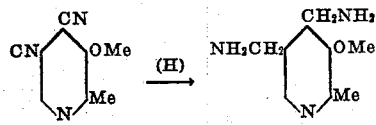

VI. Preparation of 2-methyl-3-hydroxy-4,5-di(amino-methyl)-pyridine.

36.2 grams of the residue obtained in step V is refluxed in a suitable condenser with 400 cc. of 50% hydrobromic acid until distillation over of methyl bromide stops. The solution is cooled and if necessary, concentrated and five volumes of acetone added. The solution is now cooled in ice and yellowish crystals separate which are filtered off. These solids are dissolved in water and exactly neutralized with potassium hydroxide after which the neutral solution is evaporated to dryness under reduced pressure and the residue taken up in alcohol. The inorganic salts, such as potassium bromide or the bromide of the particular alkali used are filtered off. Potassium hydroxide is preferable because of the somewhat less solubility in alcohol of potassium bromide.

The filtrate is evaporated, again taken up in alcohol, and filtered and evaporated to dryness.

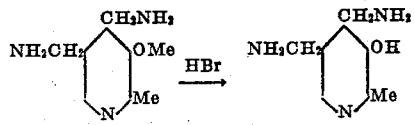

VII. Formation of vitamin B, 2-methyl-3-hydroxy-4,5-di-(hydroxymethyl)-pyridine.

16.7 grams of the 2-methyl-3-hydroxy-4,5-di-(aminomethyl)-pyridine as obtained above is dissolved in 135 cc. of 10% sulfuric acid and the solution cooled to 0° to 5° C. A cold concentrated aqueous solution of 35.5 grams sodium nitrite is slowly added with vigorous agitation and the mixture slowly heated to nearly the boiling point and maintained at such temperature for ten minutes. While the solution is still warm, a sufficient amount of urea is added to destroy the sodium nitrite and the solution is then cooled. It is then exactly neutralized with potassium hydroxide and evaporated to dryness under reduced pressure. The dry solid is repeatedly extracted with methanol and the combined methanol extracts evaporated to dryness. This residue is the vitamin $B_6$. If further purification is necessary, sublimation in high vacuum may be used or proper process of crystallization utilized.

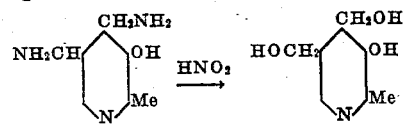

The synthesized product crystallizes into colorless odorless needles having a melting point of 158-9° C. It is soluble in methanol, ethanol ether and acetone.

The yield of the synthetic vitamin secured in accordance with the above is satisfactory and by the use of cinchoninic acid as starting material greatly enlarges the field for the production of this important vitamin.

I claim:

1. In a process of preparing vitamin $B_6$, the steps comprising treating 2-methyl-3-alkoxy-4,5-bis(aminomethyl)-pyridine with hydrobromic acid as a dealkylating agent to form 2-methyl-3-hydroxy-4,5-bis(aminomethyl)-pyridine, and reacting the resulting 2-methyl-3-hydroxy-4,5-bis(aminomethyl)-pyridine with an agent selected from the group consisting of nitrous acid and products capable of splitting off nitrous acid as a deaminating agent to form vitamin $B_6$.

2. In a process of preparing vitamin $B_6$, the steps comprising treating 2-methyl-3-methoxy-4,5-bis(aminomethyl)-pyridine with hydrobromic acid as a dealkylating agent to form 2-methyl-3-hydroxy-4,5-bis(aminomethyl)-pyridine, and reacting the resulting 2-methyl-3-hydroxy-4,5-bis(aminomethyl)-pyridine with an agent selected from the group consisting of nitrous acid and products capable of splitting off nitrous acid as a deaminating agent to form vitamin $B_6$.

LESTER J. SZABO.